(12) United States Patent
Wang (10) Patent No.: US 7,240,598 B2
(45) Date of Patent: Jul. 10, 2007

(54) POWER TRANSMISSION STRUCTURE WITH DUAL BLADE SHAFT OF A CIRCULAR SAW

(76) Inventor: Chun-Hsiang Wang, P.O. Box 82-144, Taipei (TW)

( * ) Notice: Subject to any disclaimer, the term of this patent is extended or adjusted under 35 U.S.C. 154(b) by 69 days.

(21) Appl. No.: 10/968,123

(22) Filed: Oct. 20, 2004

(65) Prior Publication Data

US 2006/0081104 A1    Apr. 20, 2006

(51) Int. Cl.
*B27B 5/22*    (2006.01)
*B27B 5/29*    (2006.01)

(52) U.S. Cl. .............. 83/863; 83/477.1; 83/477.2; 83/491; 144/3.1

(58) Field of Classification Search .............. 83/49, 83/471.1, 473, 477.2, 491, 863, 864, 865, 83/882, 887, 488, 489, 477.1; 144/3.1
See application file for complete search history.

(56) References Cited

U.S. PATENT DOCUMENTS

| | | | | |
|---|---|---|---|---|
| 4,181,164 A | * | 1/1980 | Meniconi | ............ 144/3.1 |
| 4,308,777 A | * | 1/1982 | Lawson | ............ 83/477.2 |
| 4,334,450 A | * | 6/1982 | Benuzzi | ............ 83/471.2 |
| 4,534,256 A | * | 8/1985 | Benuzzi | ............ 83/863 |
| 4,706,535 A | * | 11/1987 | Ducharme | ............ 83/863 |
| 5,117,722 A | * | 6/1992 | Letendre | ............ 83/863 |
| 5,148,732 A | * | 9/1992 | Striebig | ............ 83/863 |
| 5,193,428 A | * | 3/1993 | Letendre | ............ 83/863 |
| 6,968,767 B2 | * | 11/2005 | Yu | ............ 83/473 |

* cited by examiner

*Primary Examiner*—Clark F. Dexter
(74) *Attorney, Agent, or Firm*—Leong C. Lei (57) ABSTRACT

A power transmission structure with a dual blade shaft of a circular saw wherein the rear end of the driving shaft of the driving roller is provided with a fixing plate pivotally mounted with a steering roller, a steered roller and a dual level transmission roller. These rollers are surrounded with a first transmission belt, and the fixing plate is provided with a floating rod having an adjustable roller. The rear end of the driven shaft has a driven roller, and the driven roller, the adjustable roller and the dual level transmission roller are provided with a second transmission belt. The first and second transmission belts are used to cause the saw blade and pre-cut blade of the driven shaft to rotate in reverse directions. The tightness of the second transmission belt is adjusted by the floating rod.

3 Claims, 7 Drawing Sheets

PRIOR ART
FIG. 1

PRIOR ART

FIG. 2

PRIOR ART

POWER TRANSMISSION STRUCTURE WITH DUAL BLADE SHAFT OF A CIRCULAR SAW

BACKGROUND OF THE INVENTION (a) Technical Field of the Invention

The present invention relates to power transmission structure, and in particular, to a power transmission structure for a dual blade shaft of a circular saw. A first and a second transmission shaft surround a dual-layered transmission roller so that the circular saw blade on the driving shaft and the blade on the driven shaft rotate in opposite direction.

(b) Description of the Prior Art

Figure 1:
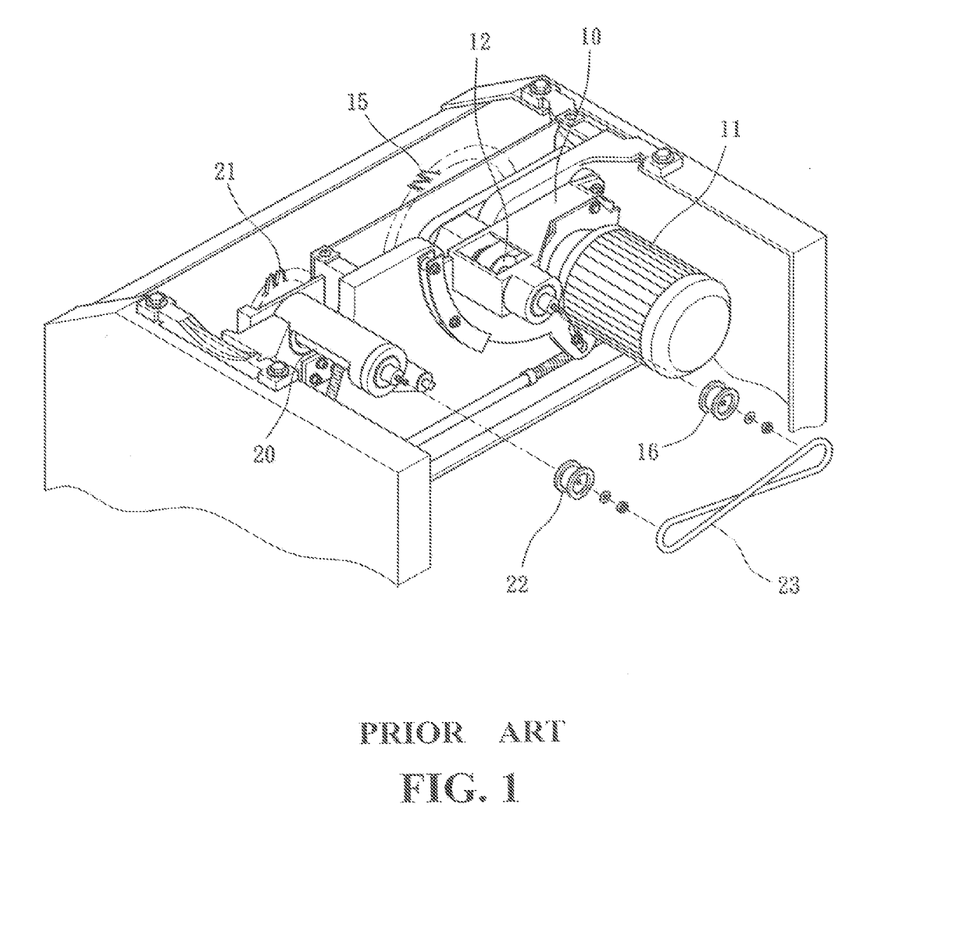
FIG. 1 shows a perspective exploded view of a conventional power transmission structure.
Figure 2:
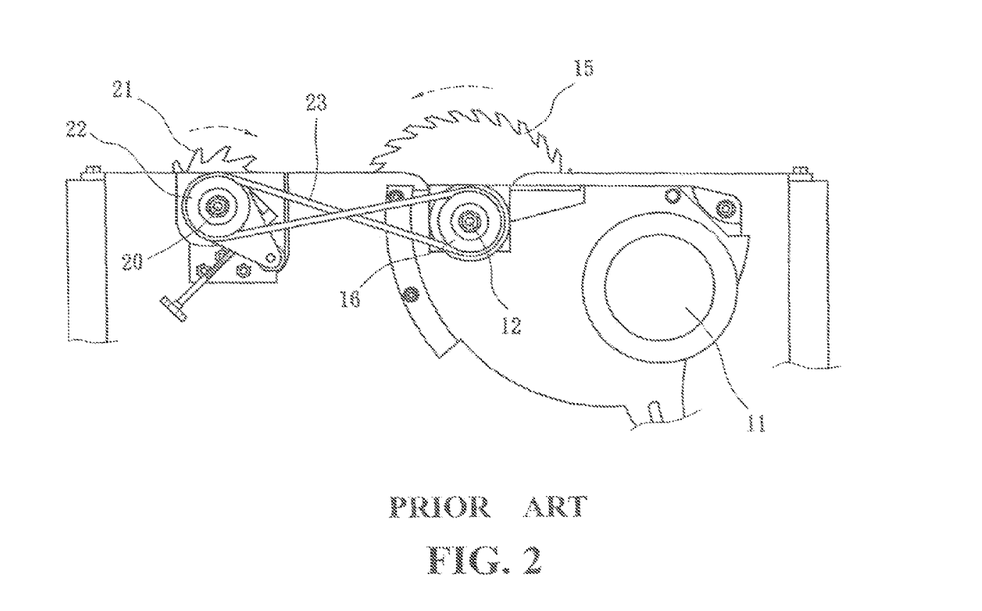
FIG. 2 shows a schematic view of a conventional power transmission structure.

A circular saw for a saw mill includes a single blade shaft and a dual blade shaft. The power transmission structure of the dual blade shaft of a conventional circular saw is shown in FIGS. 1 and 2. The platform of the circular saw has a height adjustable seat body 10 having a driving element 11. A belt is used to drive the driving shaft 12 and the driving shaft 12 on different end of the saw blade has a driving roller 16. One side of the seat body 10 is a driven shaft 20 having a pre-cut blade 21 on a straight line position with the circular saw blade 15. The other end of the driven shaft 20 is provided with a driven roller 22. An elastic transmission belt 23 is positioned between the driving roller 16 and the driven roller 22. In order to let the circular saw blade 15 and the pre-cut blade 21 rotate in opposite direction, the elastic transmission belt 23 surrounds the driving roller 16 and the driven roller in a "8" shape.

Figure 3:
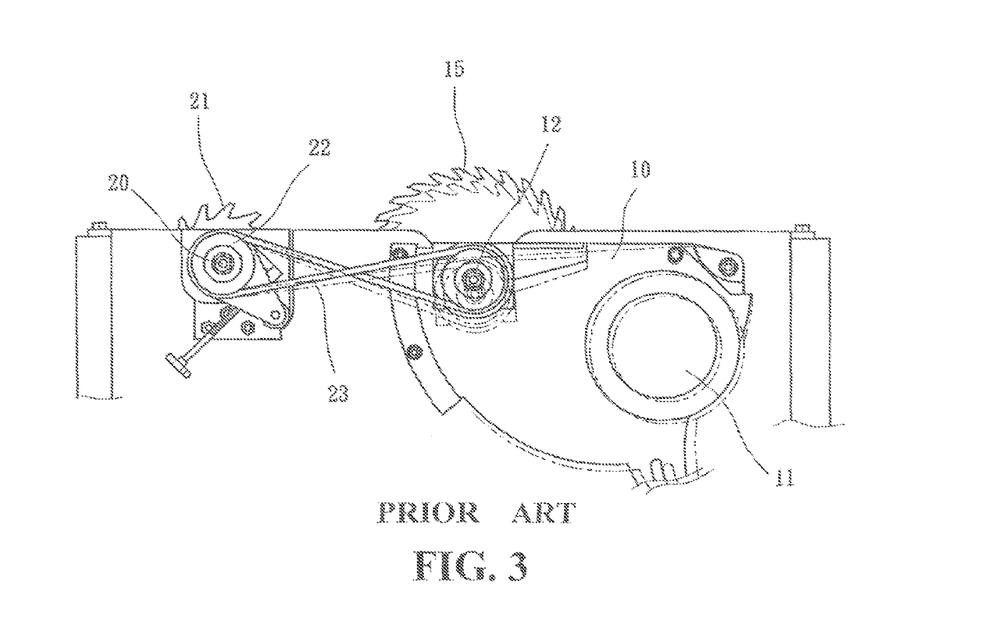
FIG. 3 shows an application view of a conventional power transmission structure.
Figure 4:
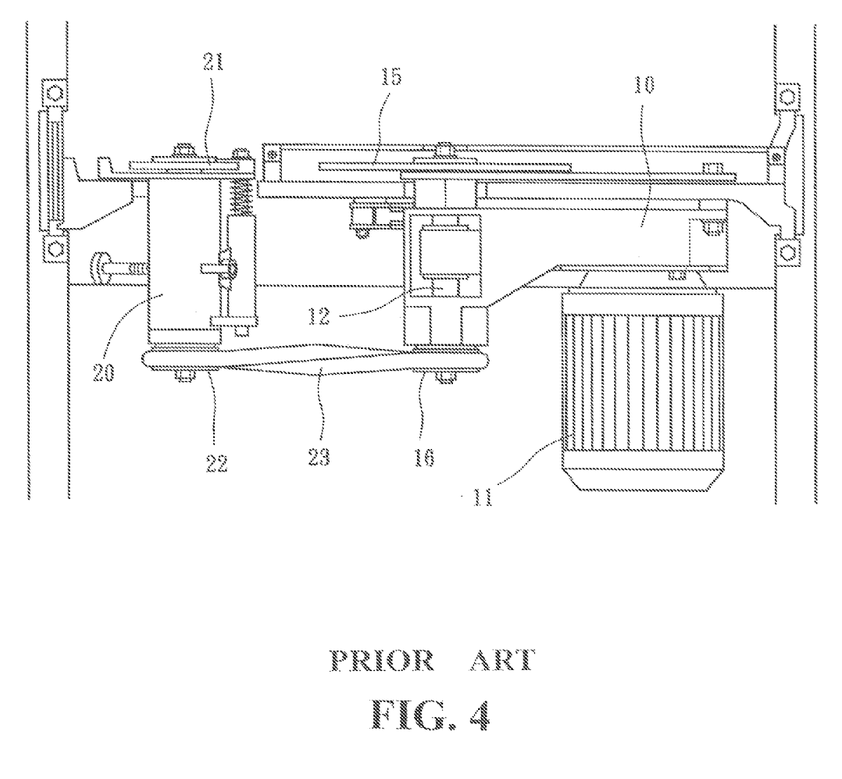
FIG. 4 shows a top view of a conventional power transmission structure.

In application, there are drawbacks found in this conventional structure. As shown in FIGS. 2, 3 and 4, due to the different in the thickness of wood, for excellent sawing of wood, the height of the saw blade 15 has to be adjusted depending on the thickness of the wood. Thus, the position of the seat body 10 has to be changed frequently. Thus, the gap between the driving roller shaft 12 and the driven shaft 20 is changed so as to maintain the transmission effectiveness. In other words, elastic transmission belt 33 is needed in order to achieve his objective.

However, the cost of the transmission belt 23 is high and therefore, the cost of production is increased. Further, the elastic transmission belt 23 does not resist to high temperature and it is fragile, and therefore, the cost of maintenance is high. In addition, the belt 23 is easily fragile and the accuracy of transmission will be affected.

SUMMARY OF THE INVENTION

Accordingly, it is an object of the present invention to provide a power transmission structure with a dual-blade shaft of a circular saw having a platform provided with a seat body with a driving member having a driving shaft with a circular saw blade, on one side of the platform being a driven shaft having a pre-cut blade on a straight line position of the circular saw blade, a power transmission structure being positioned between the driving roller and the driven roller such that the circular saw blade and the pre-cut blade rotate in reverse directions, characterized in that the driving shaft at the seat body is locked to a binding mount protruded with a fixing plate facing one side of the driven shaft, and the end of the driving shaft is provided with a driving roller through the binding mount, and the center of the fixing plate is rotatably mounted with a dual level transmission roller, and the two side corners of the fixing plate are respectively rotatably disposed with a steering roller and a steered roller, and the driving roller of the driving shaft, the steering roller, the steered roller and the front section of the dual level transmission roller is provided with a first transmission belt, wherein the first transmission belt surrounds the inner edge of the dual level transmission roller such that the rotating direction of the dual level transmission roller and the driving roller are in reverse directions; an end of the driven shaft opposite to the end having the pre-cut blade is provided with a driven roller, and the center of the bottom edge of the fixing plate is pivotally mounted with a floating rod, and the free end of the floating rod is provided with an adjusting roller, and a traction spring is mounted to the middle section of the floating rod and to the platform to pivotally bias the floating rod, and in between the driven roller, the adjusting roller and the dual level transmission roller, a second transmission belt is provided, thereby, a transmission structure with dual blade shaft of a circular saw is obtained.

Yet another object of the present invention is to provide a power transmission structure for dual blade shaft of a circular saw, wherein the longevity of application is extended, which improved its economic gain.

Still another object of the present invention is to provide a power transmission structure for dual blade shaft of a circular saw, wherein the center of the fixing plate is provided with a screw hole, and fixing plate utilizes the screw hole to pivotally lock the dual level transmission roller.

Yet a further object of the present invention is to provide a power transmission structure for dual blade shaft of a circular saw, wherein the two side corners of the fixing plate are provided with a through hole, and the fixing plate utilizes the through hole to pivotally mount the steeling roller and the steered roller.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 5:
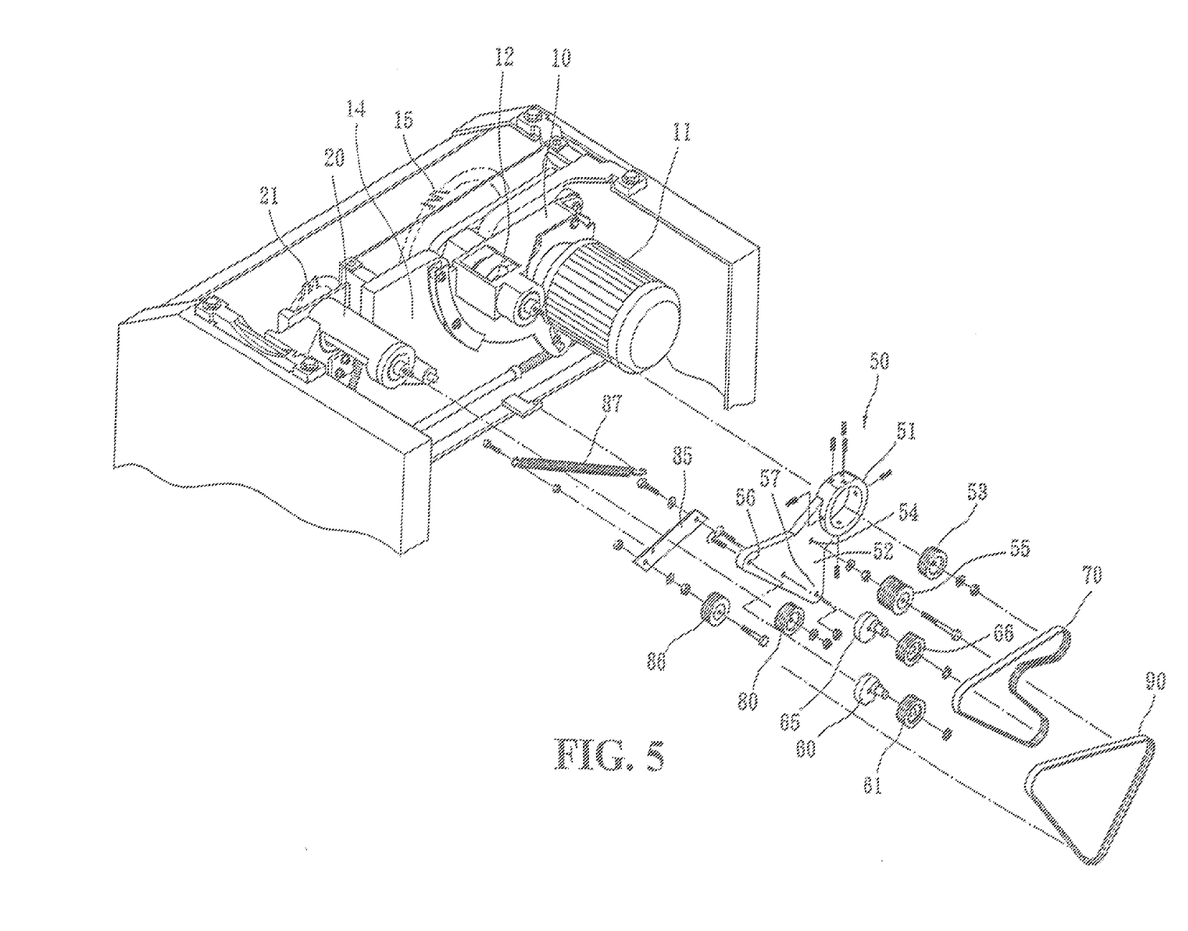
FIG. 5 is a perspective exploded view of the power transmission structure of the present invention.

In FIG. 5, there is shown a power transmission structure with a dual blade shaft of a circular saw having a platform 14 provided with a seat body 10, which is adjustable in respect of height. The seat body 10 has a driving member 11 with a driving shaft 12 driving a circular saw blade 15. At one side of the platform 14 is a driven shaft 20 having a pre-cut blade 21 on a straight line position of the circular saw blade 15. In between a driving roller 53 and a driven roller 80, a power transmission structure 50 is provided, and the circular saw blade 15 and the pre-cut blade 21 rotate in opposite directions.

Figure 6:
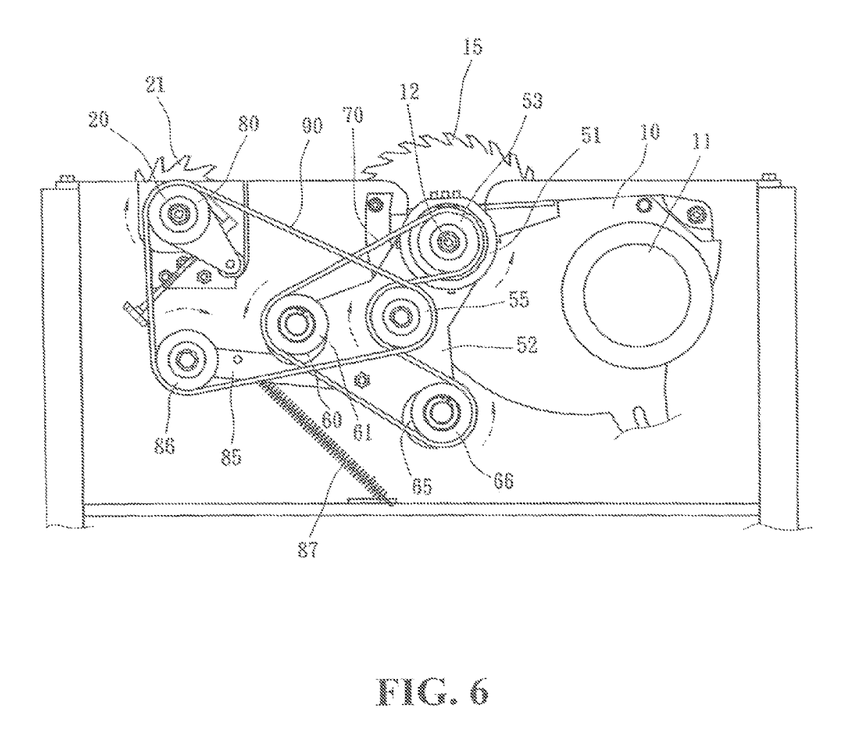
FIG. 6 is an application view of the power transmission structure of the present invention.

Referring to FIGS. 5 and 6, the driving shaft 12 at the seat body 10 is locked to a binding mount 51 protruded with a fixing plate 52 facing one side of the driven shaft 20, and an end of the driving shaft 12 is provided with the driving roller 53 through the binding mount 51. The center of the fixing plate 52 is rotatably mounted with a dual level transmission roller 55 and the two side corners of the fixing plate 52 are respectively rotatably disposed with a steering roller 61 and a steered roller 66, and the driving roller 53 of the driving shaft 12, the steering roller 61, the steered roller 66 and the front section of the dual level transmission roller 55 are engaged with a first transmission belt 70, wherein the first transmission belt 70 surrounds the inner edge of the dual level transmission roller 55 such that the dual level transmission roller 55 and the driving roller 53 rotate in reverse directions.

An end of the driven shaft 20 opposite to the end having the pre-cut blade 21 is provided with the driven roller 80, and the center of the bottom edge of the fixing plate 52 is pivotally mounted with a floating rod 85, and the free end of the floating rod 85 is provided with an adjusting roller 86, and a traction spring 87 is mounted to the middle section of the floating rod 85 and to the platform 14 to pivotally bias the floating rod 85, and in between the driven roller 80, the adjusting roller 86 and the dual level transmission roller 55, a second transmission belt 90 is provided. Thereby, a transmission structure with dual blade shaft of a circular saw is obtained.

Figure 7A:
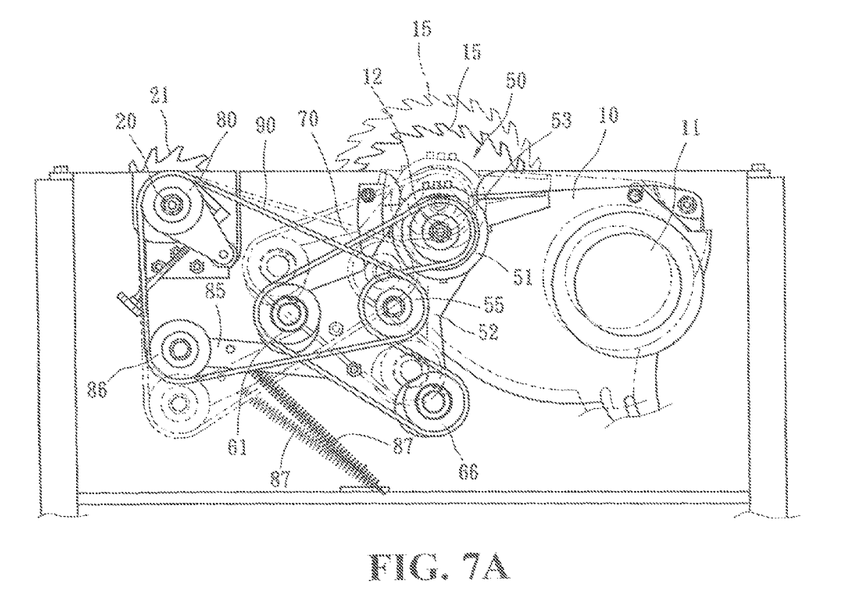
FIG. 7A is an application view of the power transmission structure of the present invention, showing the upward adjusting the circular saw blade.
Figure 7B:
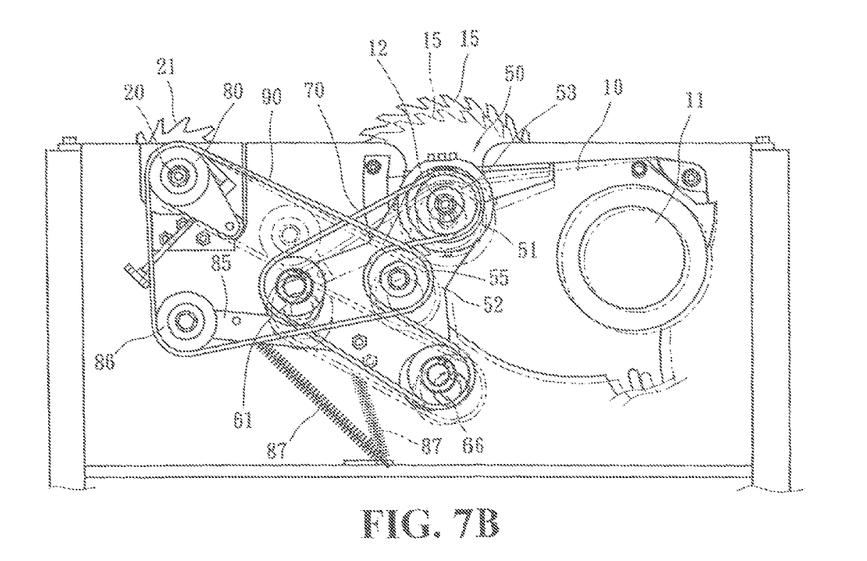
FIG. 7B is an application view of the power transmission structure of the present invention, showing the downward adjusting the circular saw blade.
Figure 8:
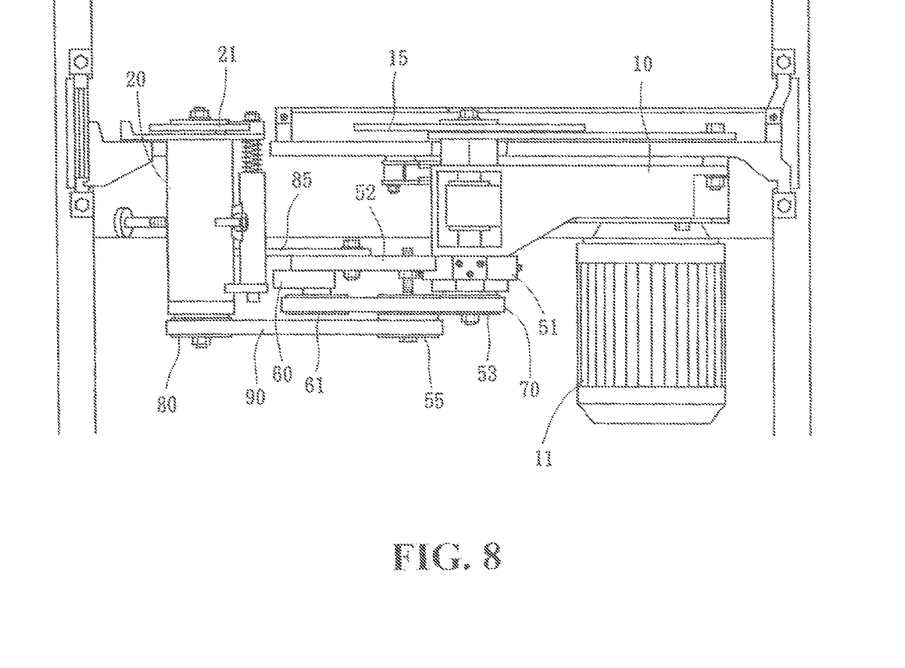
FIG. 8 is a top view of the power transmission structure of the present invention.

As shown in FIGS. 6, 7, and 8, the driving roller 53 and the first transmission belt 70 are used by the driving shaft 12 to drive the steering roller 61, the steered roller 66, and the dual level transmission roller 55. The steered roller 66 increases the circumferential edge contact of the first transmission belt 70 and the dual level transmission roller 55. This will ensure the transmission. The dual level transmission roller 55 rotates in reverse direction with the driving roller 53. Thus, when the second transmission belt 90 of the dual level transmission roller 55 drives the driven roller 80, the driven roller 80 rotates in reverse direction to the driving roller 53.

As shown in FIG. 7A, when the thickness of wood material is large and the circular saw blade 15 is needed to be adjusted upward, the seat body 10 is moved upward. Thus, the entire fixing plate 52 is being moved forward. This will shorten the distance between the dual level transmission roller 55 and the driven roller 80 such that the second transmission belt 90 will become loose. At this moment, the traction spring 87 appropriately pulls down the floating rod 85 so that the adjusting roller 86 has a larger distance with the driven roller 80, and the second transmission belt 90 is maintained in a taut position and the rotation is exact.

As shown in FIG. 7B, when the thinner wood material is needed and the circular saw blade 15 is adjusted downward, the seat body 10 is moved downward, and thus, the entire fixing plate 52 is simultaneously moved downward. At this instance, the distance between the dual level transmission roller 55 and the driven roller 80 increases such that the second transmission belt 90 produces a tight condition. At this moment, the traction spring 87 appropriately releases the floating rod 85 such that the distance between the adjusting roller 86 and the driven roller 80 is shortened, and the second transmission belt 90 is maintained at the most appropriate tightness which ensures rotation.

In accordance with the present invention, the power transmission structure 50 uses high temperature resistance material for the first and second transmission belts 70, 90 which will achieve transmission and reverse direction transmission.

Further, the first and second transmission belt 70, 90 will not adhere together (as shown in FIG. 8) and therefore the belts are not easily damaged.

The center of the fixing plate 52 is provided with a screw hole 54, and the fixing plate 52 utilizes the screw hole 54 to pivotally lock the dual level transmission roller 55. The two side corners of the fixing plate 52 are provided with through holes 56, 57 and the fixing plate 52 utilizes the through holes 56, 57 to pivotally mount the steering roller 61 and the steered roller 66. The steering roller 61 and the steered roller 66 are respectively mounted to an eccentric shaft 60, 65 for the adjustment of the tightness of the first transmission belt 70.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A power transmission structure of a circular saw having a seat body with a driving member having a driving shaft driving a circular saw blade, one side of the seat body being provided with a driven shaft, the driven shaft having a pre-cut blade engaged therewith, the pre-cut blade being aligned with the circular saw blade, the power transmission structure being positioned between a driving roller and a driven roller such that the circular saw blade and the pre-cut blade rotate in reverse directions, wherein the driving shaft is locked to a binding mount protruded with a fixing plate facing one side of the driven shaft, and an end of the driving shaft is provided with the driving roller through the binding mount, and a center of the fixing plate is rotatably mounted with a dual level transmission roller, and two side corners of the fixing plate are respectively rotatably connected with a steering roller and a steered roller, and the driving roller of the driving shaft, the steering roller, the steered roller and a front section of the dual level transmission roller are engaged with a first transmission belt, the first transmission belt surrounds an inner edge of the dual level transmission roller such that the dual level transmission roller and the driving roller rotate in reverse directions, the end of the driven shaft opposite to the end engaging the pre-cut blade is provided with the driven roller, and a center of a bottom edge of the fixing plate is pivotally mounted with a floating rod, and a free end of the floating rod is provided with an adjusting roller, and a traction spring is mounted to a middle section of the floating rod to pivotally bias the floating rod, and the driven roller, the adjusting roller and the dual level transmission roller are engaged with a second transmission belt.

2. The power transmission structure of claim 1, wherein the center of the fixing plate is provided with a screw hole, and the fixing plate utilizes the screw hole to rotatably mount the dual level transmission roller.

3. The power transmission structure of claim 1, wherein the two side corners of the fixing plate are each provided with a through hole, and the fixing plate utilizes the two through holes to rotatably mount the steering roller and the steered roller.

* * * * *